United States Patent [19]

Epperly et al.

[11] Patent Number: 5,749,928
[45] Date of Patent: May 12, 1998

[54] METHOD FOR REDUCING EMISSIONS FROM OR INCREASING THE UTILIZABLE ENERGY OF FUEL FOR POWERING INTERNAL COMBUSTION ENGINES

[75] Inventors: W. Robert Epperly, New Canaan; Barry N. Sprague, Bethlehem, both of Conn.; Danny T. Kelso, Houston, Tex.; Wayne E. Bowers, North Vassalboro, Me.

[73] Assignee: Platinum Plus, Inc., Stamford, Conn.

[21] Appl. No.: 601,530

[22] Filed: Feb. 14, 1996

Related U.S. Application Data

[63] Continuation of Ser. No. 439,697, May 12, 1995, abandoned, and a continuation-in-part of Ser. No. 897,869, Aug. 19, 1986, Pat. No. 4,891,050, and a continuation of Ser. No. 120,651, Sep. 13, 1993, abandoned, which is a continuation of Ser. No. 896,896, Jun. 10, 1992, abandoned, which is a continuation of Ser. No. 794,329, Nov. 12, 1991, abandoned, which is a continuation of Ser. No. 291,245, Dec. 28, 1988, abandoned, said Ser. No. 439,097, is a continuation-in-part of Ser. No. 897,864, Aug. 19, 1986, Pat. No. 4,892,562, which is a continuation-in-part of Ser. No. 796,428, Nov. 8, 1985, abandoned, which is a continuation-in-part of Ser. No. 677,954, Dec. 4, 1984, abandoned, and a continuation-in-part of Ser. No. 790,738, Oct. 24, 1985, abandoned, said Ser. No. 897,869, is a continuation-in-part of Ser. No. 796,428, Nov. 8, 1985, abandoned, which is a continuation-in-part of Ser. No. 677,954, Dec. 4, 1984, abandoned, and a continuation-in-part of Ser. No. 790,738, Oct. 24, 1985, abandoned.

[51] Int. Cl.$^6$ .................................................. C10L 1/30
[52] U.S. Cl. ..................... 44/358; 44/354; 44/352; 44/439; 44/449; 44/451
[58] Field of Search .................. 44/358, 359, 361, 44/354, 363, 352, 439, 449, 451; 556/32, 136, 137

[56] References Cited

U.S. PATENT DOCUMENTS

| | | | |
|---|---|---|---|
| 2,086,775 | 7/1937 | Lyons et al. | 44/69 |
| 2,151,432 | 3/1939 | Lyons et al. | 44/69 |
| 2,875,223 | 2/1959 | Pedersen et al. | 260/493 |
| 3,159,659 | 12/1964 | Pruett et al. | |
| 3,328,440 | 6/1967 | Shapiro et al. | 536/136 |
| 3,369,035 | 2/1968 | Schultz | 252/49.7 |
| 3,397,214 | 8/1968 | Schultz | 252/49.7 |
| 4,207,078 | 6/1980 | Sweeney et al. | |

(List continued on next page.)

FOREIGN PATENT DOCUMENTS 1948837   4/1970   Germany.

OTHER PUBLICATIONS

Chemical Abstracts 76 112565 p (1792).
Chemical Abstracts 7 113355 g (1792).
Belluco, Organometallic and Coordination Chemistry of Platinum, Academic Press, NY, pp. 221, 222, 226, 232, 295–297, 441–442, 449, 454 & 455 (1974).
Deganello, Transition Metal Complexes of Cyclic Polyoefins, Academic Press, NY, pp. 97–100, 102, 277–278, 281–283, 288–291 (1979).
Dickson, Organometallic Chemistry of Rhodium and Iridium, Academic Press NY, pp. 167–169, 178–180, 198–200, 220–226, 248, 258–260, 264, 271 & 277 (1983).
Chemical Abstracts 82 4403z (1975).
Chemical Abstracts 97 110175w (1982).
Chemical Abstracts 97 110181v (1982).

(List continued on next page.)

*Primary Examiner*—Margaret Medley
*Attorney, Agent, or Firm*—St. Onge Steward Johnston & Reens LLC

[57] ABSTRACT

The invention presented involves a method for reducing emissions from or increasing the utilizable energy of fuel for powering diesel, gasoline or gasohol internal combustion engines, the method comprising admixing with the fuel an additive which comprises a fuel-soluble, nonionic, organometallic platinum group metal coordination composition which is a) resistant to breakdown under ambient temperatures; b) does not contain a disadvantageous amount of phosphorus, arsenic, antimony or halides; and c) has a partition ratio sufficient to maintain preferential solubility in the fuel.

37 Claims, 3 Drawing Sheets

U.S. PATENT DOCUMENTS

| | | | |
|---|---|---|---|
| 4,225,529 | 9/1980 | Hydes et al. | 260/429 R |
| 4,242,099 | 12/1980 | Malec . | |
| 4,295,816 | 10/1981 | Robinson | 123/1 A |
| 4,469,638 | 9/1984 | Bonnemann | 556/136 |
| 4,533,502 | 8/1985 | Rochon et al. | 546/8 |
| 4,568,357 | 2/1986 | Simon . | |
| 4,603,215 | 7/1986 | Chandra et al. | 556/136 |
| 4,741,820 | 5/1988 | Coughlin et al. | 208/139 |
| 4,787,969 | 11/1988 | Baird, Jr. | 208/139 |
| 4,795,549 | 1/1989 | Coughlin et al. | 208/139 |
| 4,891,050 | 1/1990 | Bowers | 44/358 |
| 4,892,562 | 1/1990 | Bowers | 44/324 |
| 5,034,020 | 7/1991 | Epperby | 44/358 |

OTHER PUBLICATIONS

German Patent No. 2,500,683 Abstract 76–56 183X Brantl. Jan. 9, 1975.

Belluco, Organometallic & Coordination Chemistry of Platinum, Academic Press, NY, pp. 221, 222, 226, 232, 295–297, 441–442, 449, 454 & 455 (1974).

Deganello, Transition Metal Complexes of Cyclic Polyolefins, Academic Press, N.Y., pp. 97–100, 102, 277–278, 281–283, 288–291 (1979).

Dickson, Organmettalic Chemistry of Rhodium & Iridium, 248, 258–260, 264, 271, & 277 (1983).

Maitlis, The Organic Chemistry of Palladium, Academic Press, NY, pp. 68, 70, 76, 77, 83, 93, 102, 103, 136, 158, 165, 202–204, 228, 242, 249, 257–258 (1971).

German Patent No. 2,500,683, Abstract 76–56 183X Brantl. Jan. 9, 1975.

Chemical Abstracts 82 4403z (1975).

Chemical Abstracts 97 11017SW (1982).

Chemical Abstracts 97 110181V (1982).

Chemical Abstracts 76 112565 p (1792).

Chemical Abstracts 76 11 3355 g (1792).

METHOD FOR REDUCING EMISSIONS FROM OR INCREASING THE UTILIZABLE ENERGY OF FUEL FOR POWERING INTERNAL COMBUSTION ENGINES

RELATED APPLICATIONS

This application is a continuation of U.S. patent application Ser. No. 08/439,697, filed on May 12, 1995, now abandoned, which is a continuation-in-part of U.S. patent application Ser. No. 06/897,864, filed on Aug. 19, 1986, now U.S. Pat. No. 4,892,562, which is a continuation-in-part of U.S. patent application Ser No. 06/796,428, filed on Nov. 8, 1985, now abandoned, which is a continuation-in-part of U.S. patent application Ser. No. 06/677,954, filed on Dec. 4, 1984, now abandoned, and a continuation-in-part of U.S. patent application Ser. No. 06/790,738, filed on Oct. 24, 1985, now abandoned, and a continuation-in-part of U.S. patent application Ser. No. 06/897,869, filed on Aug. 19, 1986, now U.S. Pat. No. 4,891,050, which is a continuation-in-part of U.S. patent application Ser. No. 06/796,428, filed on Nov. 8, 1985, now abandoned, which is a continuation-in-part of U.S. patent application Ser. No. 06/677,954, filed on Dec. 4, 1984, now abandoned and a continuation-in-part of U.S. patent application Ser No. 06/790,738, filed on Oct. 24, 1985, now abandoned, and a continuation of U.S. patent application Ser. No. 08/120,651, filed on Sep. 13, 1993, now abandoned, which is a continuation of U.S. patent application Ser. No. 07/896,896, filed on Jun. 10, 1992, now abandoned, which is a continuation of U.S. patent application Ser. No. 07/794,329, filed on Nov. 12, 1991, now abandoned, which is a continuation of U.S. patent application Ser. No. 07/291,245, filed on Dec. 28, 1988, now abandoned.

TECHNICAL FIELD

The present invention relates to improving the performance of internal combustion engines utilizing hydrocarbon fuels including gasoline, gasohol and diesel fuel, and, more particularly, to the use of additives and fuels which burn more efficiently and with reduced noxious emissions.

BACKGROUND ART

Prior investigations involving the use of platinum group metals in internal combustion engines have led to the development of the catalytic converter for emissions reduction. Mechanical equipment has become one acceptable alternative to accomplish desired combustion improvements. Efforts are under way to also achieve such results through better combustion conditions through engine design and fuel additives. The efforts in engine design have provided significant improvements, but the objectives of improved operating efficiency and reduced noxious emissions are difficult to achieve simultaneously.

Experiences to date with fuel additives have been less successful. For example, Lyons and McKone disclose in U.S. Pat. Nos. 2,086,775 and 2,151,432 adding from 0.001–0.085% (i.e. from 10 to 850 parts per million) of an organometallic compound or mixture to a base fuel such as gasoline, benzene, fuel oil, kerosene or blends to improve various aspects of engine performance. Included among the metals disclosed in these patents are the platinum group metals platinum and palladium. In both patents the preferred organometallic compounds are the beta diketone derivatives and their homologues such as the metal acetylacetonates, propionylacetonates, formylacetonates, and the like. The two Lyons and McKone patents state that concentrations of from 0.001–0.04%, (i.e. from 10 to 400 parts per million) are not effective to improve combustion efficiency as introduced, but may become so under prolonged use as catalytically active deposits are built up in the combustion chamber. The disclosures further state that about 0.01% (i.e. 100 ppm) of the organometallic compound is usually sufficient, once the requisite amount of catalytically active deposits has been built up, to perpetuate that amount of deposits by replacement of losses therefrom. The compounds disclosed were therefore not capable of generating any instantaneous catalytic effect at low concentrations, and in higher concentrations would provide no economic benefit. This fact is confirmed in U.S. Pat. No. 2,460,780 to Lyons and Dempsey at col. 1, lines 11–36.

The Lyons and Dempsey patent relates principally to employing catalysts which are soluble in water or other "internal liquid coolants" such as alcohol or soluble glycols or aqueous solutions of these. While catalyst levels based on the weight of metal compounds as low as 0.001% are disclosed, it is stated that for immediate catalytic effect, the catalyst compounds for useful effect may be present at a level of at least 1% of the weight of the operating fuel charge. No disclosure is given of fuel soluble catalysts at levels below 0.01% or without oxygenated solvents. Moreover, where alcohol and glycols are employed with water soluble catalysts, they are disclosed principally as solublizing carriers for catalysts and for their known internal cooling function at high load.

Robinson, in U.S. Pat. No. 4,295,816, discloses an elaborate delivery system for introducing water soluble platinum group metal salts through the air intake of internal combustion engines to deliver platinum group metal catalysts to the combustion chamber at a level no greater than 9 milligram catalyst per kilogram of fuel. The equipment disclosed by Robinson, unfortunately, is far more complicated than would be desired for automotive operators and the water soluble salts employed e.g. halides, have disadvantages alone or when dissolved.

In German Offenlegungsschrift 2,500,683, Brantl discloses a wide variety of catalytic metals which may be added to hydrocarbon fuels to reduce nitrogen monoxide and oxidize carbon monoxide at the moment of combustion in internal combustion engines. Among the metals disclosed are metal complexes of the metals ruthenium, rhodium, palladium, osmium, iridium and platinum, with different ligands, which can be added to the fuel individually or as a mixture. For these platinum group metals, broad concentration ranges of from 0.347 to 3.123 grams per liter of fuel are suggested for the various compositions listed in the disclosure, with the range for particularly favorable results being from 0.868 to 1.735 grams per liter of fuel. Considering the cost of these metals and the compositions containing them, there is a negative incentive for employing them at the high levels stated by the disclosure as effective. Moreover, the disclosed tetramethyl platinum compound is not known to exist.

Although the prior art has identified the platinum group metal compounds as superior catalysts for improving fuel efficiency and reducing noxious emissions, an ongoing problem has been to produce a platinum group metal compound which is sufficiently stable for packaging and delivery to the engine as well as having sufficient solubility in the fuel and insolubility in water which may be contained with the fuel. Unfortunately, nothing in the prior art has provided such compounds.

DISCLOSURE OF INVENTION

The present invention comprises a method for reducing emissions from or increasing the utilizable energy of fuels for internal combustion engines and involves the application of certain platinum group metal compounds which are directly soluble in the fuels. The compounds, preferably in combination with a solvent for them which is also miscible in the fuel, are most advantageously employed at very small but catalytically effective levels to provide from about 0.01 to about 1.0 parts of platinum group metal per 1 million parts of fuel (ppm). For the purposes of this description, all parts per million figures are on a weight to volume basis, i.e., grams/million cubic centimeters (which can also be expressed as milligrams/liter), and percentages are given by weight, unless otherwise indicated.

BRIEF DESCRIPTION OF THE DRAWING

The present invention will be better understood and its advantages more apparent in view of the following detailed description, especially when read with reference to the appended drawings, wherein.

DETAILED DESCRIPTION OF THE PREFERRED EMBODIMENT

Figure 1:
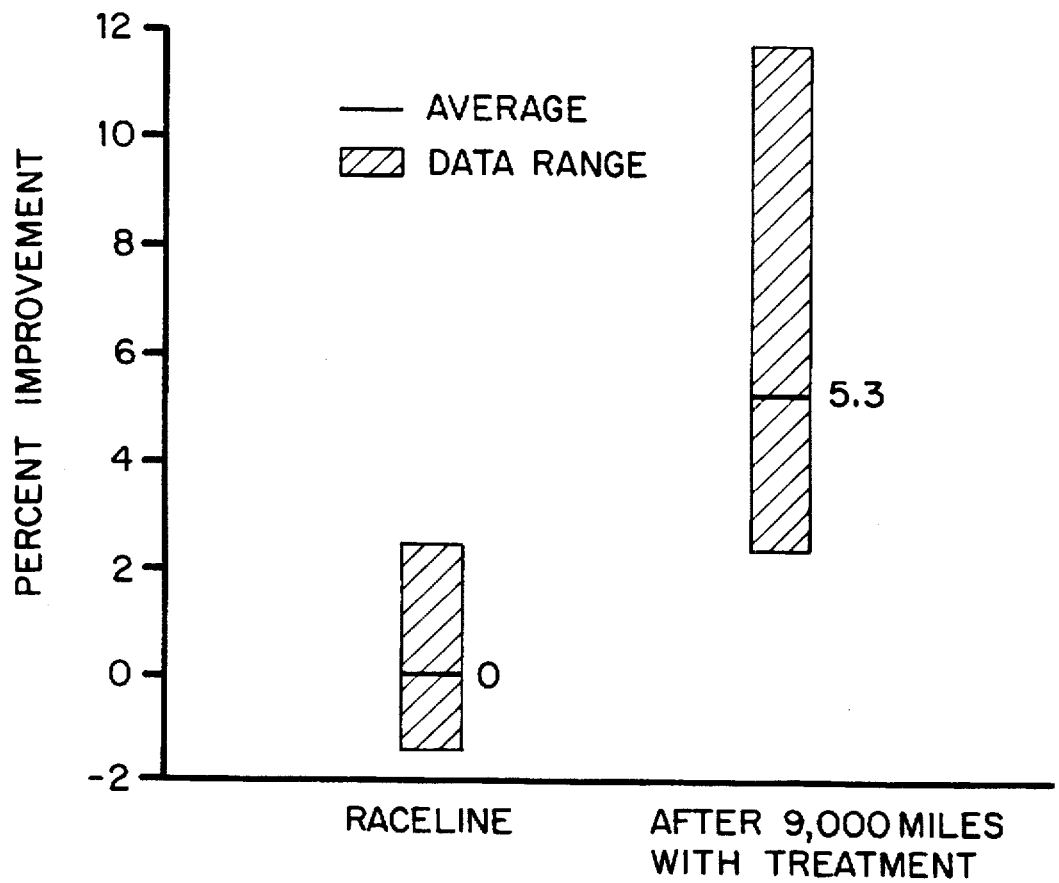
FIG. 1 graphically represents the results of Example IVb.

The fuels used in internal combustion engines for which the method of this invention is effective include hydrocarbon fuels such as gasoline, diesel fuel and gasohol. Other fuels such as methane, propane, butane, residual fuel, kerosene and jet fuel can also be included consistent with engine design, availability and economics. For the purposes of this description, the term "gasoline" can be defined as a mixture of volatile hydrocarbons, including paraffinic, naphthenic, aromatic and olefinic hydrocarbons having a boiling range from about 75° F. to 450° F., for use in a spark-ignited internal combustion engine and having an octane rating [(research+motor)/2] of at least 80, typically about 87 to 89 or above, and according to the most preferred aspects of the invention, having less than about 1.4 grams per gallon of lead. Most preferably, the gasoline will be "unleaded" and contain no more than about 0.05 grams of lead per gallon and no more than about 0.1% of sulfur. Gasoline typically has a British Thermal Unit (BTU) value of about 19,700 calories per pound. Moreover, the term "diesel fuel" can be defined as fuel oil Nos. 2 or 4 petroleum distillates or No. 6 residual fuel of volatility and cetane number characteristics effective for the purpose of fueling a wide range of internal combustion diesel engines; and the term "gasohol" can be defined as a blended mixture of gasoline, as defined above, and an alcohol, such as methanol, ethanol, tertiary butyl alcohol, isopropanol and/or pentanol, optionally with water and/or surfactants, of volatility and octane number characteristics effective for the purpose of fueling internal combustion gasoline engines.

The method of the present invention comprises admixing with the fuel an additive which comprises a fuel-soluble, nonionic, organometallic platinum group metal coordination composition. The composition should be temperature stable, should not contain a substantial amount of phosphorus, arsenic, antimony or halides and should have a partition ratio sufficient to maintain significant preferential solubility in the fuel. The nonionic, organic nature of the composition provides solubility in the fuels discussed above, thereby facilitating the introduction of the additive into the combustion chamber. Without such solubility, much of the additive would precipitate in the fuel tank or fuel lines of the engine prior to introduction into the combustion chamber.

The invention identifies temperature stability of the additive as important in practical and operational terms. In a commercial setting, a fuel additive is packaged and then can often sit on a store shelf or in a delivery truck for extended periods of time during which the additive can be exposed to great variations in temperature. If the breakdown temperature of the additive is not sufficiently high (i.e. if the additive is not temperature stable at the temperatures to which it is expected to be exposed), then the packaged additive will quickly break down and become virtually useless. Moreover, breakdown of the additive after mixing with the fuel will render the additive insoluble in the fuel, since the solubility is provided by the organic functional groups. Such loss of solubility will cause the additive to precipitate and not reach the combustion chamber, as discussed above. Typically, the breakdown temperature of the additive should be at least about 40° C., preferably at least about 50° C. in order to protect against most temperatures to which it can be expected to be exposed. In some circumstances, it will be necessary that the breakdown temperature be no lower than about 75° C.

In general, the additive comprises the platinum metal group composition as well as an oxygenated solvent therefor, as will be discussed in more detail below. The nonionic, organic nature of the platinum group metal composition helps to maintain the composition in solution in the solvent, thereby preventing "plating out" of the platinum group metal composition in the packaging medium.

As noted, the additive of the present invention should not contain a substantial amount of objectionable functional groups such as phosphorus, arsenic, antimony and, especially, halides, which have significant disadvantages like "poisoning" or otherwise reducing the effectiveness of the platinum group metal composition catalyst. Halides have the additional undesirable effect of rendering a platinum group metal more volatile, leading to reduction of the amount of platinum group metal in the combustion chamber and engine system. A substantial amount of such functional groups is considered an amount effective to significantly reduce the effectiveness of the catalyst. Preferably, the purified platinum group metal additive composition contains no more than about 500 ppm (on a weight per weight basis) of phosphorus, arsenic, antimony or halides, more preferably no more than about 250 ppm. Most preferably, the additive contains no phosphorus, arsenic, antimony or halides. Such objectionable functional groups can be minimized in several ways. The platinum group metal composition can be prepared in a process which utilizes precursors or reactant compositions having a minimum of such functional groups; or the additive can be purified after preparation. Most such methods of purification are known to the skilled artisan.

One preferred method of purifying the platinum group metal additive to remove halides is a process utilizing silver salts having non-halide anions which are harmless as compared to the halides being replaced and involves reacting them with the platinum group metal compound, whereby the halides in the composition are replaced by the anion of the silver salt (which can be any silver salts of carboxylic acids, such as silver benzoate, or silver nitrate) and the resulting composition is free of halides, plus a silver halide is produced. For instance, a slurry or solution in a polar solvent such as acetone or an alcohol and water of silver nitrate or silver benzoate can be prepared and reacted with the platinum group metal composition. The resultant platinum group metal composition is a benzoate or nitrate salt with silver halide also being produced. This process can be expected to reduce the halide content of a sample by about 50%, and even up to about 90% and higher.

The relative solubility of the additive in the fuel and water is also important since there is often a substantial amount of water admixed in with fuel. This relative solubility can be referred to as the partition ratio and is expressed as the ratio of the amount in milligrams per liter of composition which is present in the fuel to the amount of which is present in the water in a 100 milliliter (ml) sample which is 90% fuel and 10% water. The preferential solubility of the additive in fuel as compared to water (expressed as the partition ratio) can be critical because if a substantial amount of the additive is dissolved in the water which may be present, the overall effectiveness of the additive is proportionally reduced.

When the fuel being utilized is gasoline or diesel fuel, this partition ratio should be at least about 25 and most preferably greater than about 50. Because of the increased solubility of an organic platinum group metal composition in water as compared to gasohol, the partition ratio in gasohol could often not be expected to be as high but, rather, it could be as low as 10, and even 2. Such a low partition ratio is not desired (although as low as 5 in gasohol could be considered marginally operable). Indeed, partition ratios of much higher, i.e., at levels of those for gasoline or diesel fuel, are sought. In order to reduce the water susceptibility of the platinum group metal composition, it is desired that the composition have at least one platinum group metal-to-carbon covalent bond. A platinum group metal-to-oxygen or platinum group metal-to-nitrogen bond is acceptable when the ligand is neutral (as will be discussed in more detail below), but there must also be at least one metal to carbon bond.

Platinum group metals include platinum, palladium, rhodium, ruthenium, osmium and iridium. Compounds including platinum, palladium and rhodium, especially platinum alone or possibly in combination with rhodium are preferred in the practice of this invention since the vapor pressure of these metals is sufficiently high to form engine deposits which have the desired effect on combustion.

Specific suitable compounds according the present invention include those platinum metal group-containing compositions selected from the group consisting of a) a composition of the general formula

wherein $L^1$ is either a single cyclic polyolefin or nitrogenous bidentate ligand or a pair of nitrogenous or acetylenic monodentate ligands; and $R^1$ and $R^2$ are each, independently, substituted or unsubstituted methyl, benzyl, aryl, cyclopentadiene or pentamethyl cyclopentadiene, preferably benzyl, methyl and/or phenyl;

b) a composition of the general formula

wherein $L^2$ is either a single cyclic polyolefin or nitrogenous bidentate ligand or a pair of nitrogenous or acetylenic monodentate ligands; $M^1$ is rhodium or iridium; and $R^3$ is cyclopentadiene or pentamethyl cyclopentàdiene;

c) a composition of the general formula

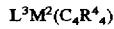

wherein $L^3$ is either a single cyclic polyolefin or nitrogenous bidentate ligand or a pair of nitrogenous monodentate ligands; $M^2$ is platinum, palladium, rhodium or iridium; and $R^4$ is $COOR^5$, wherein $R^5$ is hydrogen or alkyl having from 1 to 10 carbons, preferably methyl;

d) a composition of the general formula

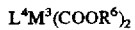

or a dimer thereof, wherein $L^4$ is a non-nitrogenous cyclic polyolefin ligand, preferably cyclooctadiene or pentamethyl cyclopentadiene; $M^3$ is platinum or iridium; and $R^6$ is benzyl, aryl or alkyl, preferably having 4 or more carbons, most preferably phenyl;

e) a composition comprising the reaction product of $[L^5RhX]_2$ and $R^7MgX$ wherein $L^5$ is a non-nitrogenous cyclic polyolefin ligand, preferably cyclooctadiene or pentamethyl cyclopentadiene; $R^7$ is methyl, benzyl, aryl, cyclopentadiene or pentamethyl cyclopentadiene, preferably benzyl or phenyl; and X is a halide. Although presently uncharacterized, it is believed that this reaction product assumes the formula $L^5RhR^7$.

Functional groups which are especially preferred for use as ligands $L^1$ through $L^3$ are neutral bidentate ligands such as cyclopentadiene, cyclooctadiene, pentamethyl cyclopentadiene, cyclooctatetrene, norbornadiene, o-toluidine, o-phenantholine and bipyridine. Most preferred among monodentate ligands is pyridine.

The synthesis of the preferred compounds is relatively straightforward, with the most care being taken to avoid "contamination" of the product by the objectionable functional groups discussed above. For instance, the most preferred synthetic route for production of the compounds of the formula $L^1PtR^1R^2$ is by reacting commercially available platinum halides with the desired neutral ligand (except the pyridine derivative which can be added by displacement after the fact) and then reacting with a Grignard reagent having the formula $R_2MgX$, where X is a halide (and where the desired $R^1$ and $R^2$ in the end product are the same functional group). Where the $R^1$ and $R^2$ functional groups are desired to be different, a straightforward substitution reaction can then be run. Exemplary of compounds suitable for use in the present invention and prepared in this manner are dipyridine platinum dibenzyl; bipyridine platinum dibenzyl; cyclooctadiene platinum dimethyl; cyclooctadiene platinum diphenyl; cyclooctadiene platinum dibenzyl; cyclooctadiene platinum methyl cyclopentadiene; norbornadiene platinum di-cyclopentadiene; and dimethyl platinum cyclooctatetrene (which often assumes the formula dimethyl platinum cyclooctatetrene platinum dimethyl).

The compounds of the formula $L^2M^1R^3$ are prepared along a similar pathway, as are the reaction products of $[L^5RhX]_2$ and $R^6MgX$, with the exception that the starting materials have only one R functional group and are, with respect to $L^2M^1R^3$, $L^2RhR^3$ or $L^2IrR^3$. Exemplary of suitable compounds of the formula $L^2M^1R^3$ are cyclooctadiene rhodium cyclopentadiene; cyclooctadiene rhodium pentamethyl cyclopentadiene; norbornadiene rhodium pentamethyl cyclopentadiene; cyclooctadiene iridium cyclopentadiene; cyclooctadiene iridium pentamethyl cyclopentadiene; norbornadiene iridium cyclopentadiene; and norbornadiene iridium pentamethyl cyclopentadiene. Exemplary of compounds which can function as the precursors for the reaction product can include cyclooctadiene rhodium chloride dimer and benzyl magnesium chloride.

Advantageously, in the Grignard-type syntheses, the Grignard reagent can be replaced by one having the formula $R_2Z$ where Z is commonly Na, Li, K or Tl. This is especially preferred since the halides which are present in a Grignard reagent are eliminated, providing less halides in the final product and also advantageously producing a higher yield of the desired product.

The preparation of compositions of the formula $L^3M^2(C_4R^4_4)$ is also straightforward and proceeds by reacting $M^2$(dibenyilidine acetone)$_2$ with dimethylacetylene dicarboxylate in acetone and then adding the $L^3$ ligand. Exemplary of suitable compounds according this formula, which has the structure

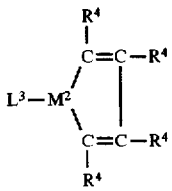

is tetrakis (methoxy carbonyl) palladia cyclopentadiene (wherein $L^3$ is cyclopentadiene, $M^2$ is palladium, and $R^4$ is COOCH$_3$).

The compositions of the formula $L^4M^3(COOR^5)_2$ can be prepared by reacting $L^4M^3X_2$, where X is a halide and a silver carboxylate such as silver benzoate. This composition can form a dimer, especially when $M^3$ is platinum. Exemplary of suitable compounds having the general formula $L^4M^3(COOR^5)_2$ are cyclooctadiene platinum dibenzoate dimer; and pentamethyl cyclopentadiene iridium dibenzoate.

The additive compositions according to the invention improve operating efficiency of internal combustion engines in terms of increased power output per unit of fuel burned which results in improved fuel economy and/or greater horsepower per revolutions per minute (RPM) and reduced emissions of particulates and noxious gases such as carbon monoxide, hydrocarbons and nitrogen monoxide. Additionally, the additive compositions of this invention can function to improve the performance of a diesel particulate trap by providing or replenishing catalyst metals on the trap, which function to facilitate the "burning off" of trapped particulates, thusly increasing the amount of time between regenerations, effectiveness and life of the trap, and decreasing the fuel penalty associated with use of a diesel trap. A portion of the catalyst metals are vaporized in the combustion chamber and travel in the exhaust gases to the trap where they perform this function.

The inventive compositions can also be used beneficially with a catalytic converter. Vaporized catalyst metal compositions can travel from the combustion chamber and replenish the converter, thus extending the effectiveness and life of the converter. In fact, a converter having no catalyst present can be installed and, over time, the practice of this invention will function to actually "load" the converter with catalyst.

The additives when added to diesel fuel and supplied to an engine are believed to reduce the so-called "delay period" which occurs immediately after injection of the fuel into the combustion chamber is initiated, due to improvement in the shape of the indicator diagram. This reduction of delay between vaporization and ignition can explain the improvements noted by the present invention but not suggested by the prior art; however, this theoretical explanation is presented only because it is the best available and there may well be others which even better explain the surprising results noted. The additives provide beneficial results over long periods of continuous use in internal combustion diesel engines.

Timing of fuel injection during the compression stroke is an important consideration in a diesel engine. Timing is optimized to maximize fuel economy while meeting important emissions standards. As already pointed out, the inventive fuel additive reduces the delay time until fuel starts to burn and its effect is similar to advancing the time of fuel injection before top dead center. As a result, there is an opportunity to re-optimize fuel injection timing (i.e., delaying injection) when the additive is used in order to optimize the overall system (improve fuel economy while meeting emission standards).

The additives are believed to improve combustion efficiency in gasoline- or gasohol-powered internal combustion engines by speeding up flame initiation from the spark and increasing subsequent flame speed. It is well known that each cycle in the spark ignition engine varies around the mean optimum pressure pattern with maximum pressure shortly after top dead center. The method of this invention is believed to reduce the so called "cyclic variation" from this optimum and thus increases the power for the same amount of fuel, which improves fuel consumption. This theory is provided to help explain the unexpected results achieved in gasoline- or gasohol-powered internal combustion engines, but it is not meant to be limiting in any regard. The additives also provide beneficial results over long periods of continuous use in internal combustion gasoline or gasohol engines.

The additive will be added to the fuel in an amount effective to improve engine performance, in terms of operating efficiency or emissions reduction. Typically, the platinum group metal compound will supply an amount of the platinum group metal within a range of about 0.01 to 1.0 parts of the platinum group metal per one million parts of fuel (ppm w/v). A more preferred range is from about 0.05 to 0.5 ppm and, most preferably, the platinum group metal will be supplied at a level of from about 0.10 to 0.30 ppm on the same basis.

The additive composition will preferably include a solvent which is soluble in the fuel, preferably made of a mixture of a carrier such as kerosene, xylene or other hydrocarbons plus certain solvents which provide enhancements in the effectiveness of the platinum group metal compound. Among the preferred solvents are oxygenated hydrocarbons, such as alcohols, heterocyclic oxygen compounds and ethers. Particularly preferred compounds are: 1 to 4 carbon alcohols, especially ethanol; acetone; tetrahydrofuran; and methyl tertiary butyl ether. Octyl nitrate also functions well in diesel fuel additives.

The fuel additive compositions may also contain other additives, such as detergents, antioxidants and octane improvers which are known as beneficial to engine performance, but the use of such is not an essential feature of the invention.

The total amount of solvent and other additives used will depend on the dosage of platinum group metal composition required and on what is a convenient concentration to handle relative to the amount of fuel to be treated. Typically, solvent (plus other like additive) volumes of about 0.1 to about 40.0 liters/gram of platinum.

Best Mode for Carrying Out the Invention

The following examples are presented for the purpose of further illustrating and explaining the present invention and the best mode for carrying it out, and are not to be taken as limiting.

EXAMPLE I a. Preparation of Cyclooctadiene Platinum Diphenyl (CODPt(C$_6$H$_5$)$_2$)

A Grignard reagent is prepared by combining 20 grams (gr) of magnesium, 135 milliliters (ml) of ethyl ether and 0.05 gr iodine crystal as a catalyst. The reaction is started by the addition of 1 ml of bromobenzene with gentle heating. A mixture comprising 113 gr of bromobenzene and 404 ml of ethyl ether is then slowly added. The reaction is allowed to go to completion by refluxing.

Thusly prepared Grignard reagent (469 ml) and 100 ml of benzene are then combined under a nitrogen blanket. Cyclooctadiene platinum dichloride (50 gr) is then slowly added, with the temperature maintained below 90° F. Ethyl ether (100 ml) and benzene (100 ml) are then added. The resultant mixture is then diluted to 1600 ml with benzene, stirred to dissolve all solids and then cooled to 0° F. The cooled solution is hydrolyzed with 201 ml of distilled water and allowed to warm to room temperature (approx. 70° F.), then washed three times with 200 ml of distilled water and slurried with about 20 gr of activated carbon. The resulting slurry is filtered and the solvents are partially evaporated under vacuum to provide a yield of $CODPt(C_6H_5)_2$ of 19.58 grams.

b. Preparation of Tetrakis (Methoxy Carbonyl) Palladia Cyclooctadiene ($CODPdC_4R_4$)

Acetone (14 gr), dimethylacetylene dicarboxylate (3.1 gr) and palladium (dibenzilidine acetone)$_2$ (1.0 gr) are mixed together for one hour. Tetrahydrofuran (14 gr) is then added, along with 3 gr of 1,5-cyclooctadiene. The solution is set aside until clear (overnight) to provide a yield of 35.0 grams of solution containing 0.5% palladium.

c. Preparation of Cyclootadiene Platinum Dibenzoate Dimer ($[CODPt(COOC_6H_5)_2]_2$)

Silver benzoate is prepared by combining 7.5 gr of sodium hydroxide and 585 ml of water; and 22.9 grams of benzoic acid and 622.5 ml of water, individually. The two thusly prepared mixtures are then combined and stirred for 1 hour (until the benzoic acid is dissolved). The pH is measured and adjusted to pH 6–8, if necessary, by adding appropriate components and the solution filtered, if necessary, to yield 1248 ml of 0.15M sodium benzoate.

To 660 ml of the thusly-prepared $NaCOOC_6H_5$ solution is added 990 ml of 0.10N silver nitrate, with stirring. The mixture is stirred for 10 minutes, filtered by vacuum and the solid saved, to yield 22.6 gr of $AgCOOC_6H_5$.

A solution of 625 ml of acetone and 625 ml of water is prepared. To this solution is added 22.5 gr of silver benzoate to form a slurry. 25 gr of cyclooctadiene platinum diiodide is then added, stirred for 1 hour and allowed to stand overnight. The solids are filtered out by vacuum and saved. 170 ml of 0.10N silver nitrate is added and the mixture stirred for 1 hour. The solids are again filtered out by vacuum and saved. The filtrate is washed twice with 1250 ml toluene, the toluene washes are combined and then treated with activated carbon, and filtered. The solvents are then partially evaporated under vacuum to provide a yield of $[(CODPt(COOC_6H_5)_2]_2$ of 0.50 grams.

e. Preparation of the Reaction Product of Cyclooctadiene Rhodium Chloride Dimer and Grignard Reagent A Grignard reagent is prepared by combining 20 gr of magnesium, 135 ml of ethyl ether and 0.05 gr of iodine crystal as a catalyst. The reaction is started by the addition of 1 ml of bromobenzene with gentle heating. A mixture comprising 113 gr of bromobenzene and 404 ml of ethyl ether is then added.

The thusly prepared Grignard reagent (37 ml) and 10 ml of benzene are then combined. Cyclooctadiene rhodium chloride dimer (6.1 gr) is then slowly added, with the temperature maintained below 90° F. Benzene (86 ml) is then added and the resultant mixture is cooled to 0° F. The cooled solution is hydrolized with 31 ml of distilled water and allowed to warm to room temperature (approx. 70° F.), then washed three times with 200 ml of distilled water and slurried with 3 gr of activated carbon and filtered. The solvents are evaporated to provide a yield of 0.67 grams.

EXAMPLE II

The partition ratio of cyclooctadiene platinum dimethyl ($CODPt(CH_3)_2$), platinum acetylacetonate ($Pt(AcAc)_2$) and dipyridine platinum acetylacetonate ($Py_2Pt(AcAc)_2$) are measured by adding 100–110 mg/l of each compound (by metal) into 90 ml of fuel (in the case of gasohol, only the hydrocarbon fraction is considered) and then 10 ml of water is added. The mixture is then shaken and set aside for 4 days. Final water and fuel layers are both analyzed for metal content. The results are calculated in terms of mg of metal/liter in both the fuel and water layers and then the ratio of mg/l in fuel:mg/l in water is calculated. These results are set out in Table 1.

TABLE 1

| Com- | Gasoline | | | Diesel | | | Gasohol | | |
|---|---|---|---|---|---|---|---|---|---|
| pound | Fuel | H$_2$O | Ratio | Fuel | H$_2$O | Ratio | Fuel | H$_2$O | Ratio |
| CODPt (CH$_3$)$_2$ | 101 | 0 | — | 104 | 0 | — | 100 | 1 | 100 |
| Pt (AcAc)$_2$ | 98 | 5 | 20 | 106 | 5 | 21 | 98 | 72 | 1.3 |
| Py$_2$Pt (AcAc)$_2$ | 78 | 200 | 0.39 | 87 | 120 | 0.72 | 87 | 164 | 0.53 |

EXAMPLE III

Silver washing of a platinum composition is accomplished by the following method:

3.02 gr of cyclooctadiene platinum diphenyl having a chloride content of 140 ppm (wt/wt) and a bromide content of 2400 ppm is admixed into a solution of 50 ml of acetone and 50 ml of water. 25 ml of 0.10N silver nitrate is added and the mixture stirred for 1 hour. The solids are filtered out, the solvents partially evaporated under vacuum and the crystals collected. The collected crystals are found to have a chloride content of 170 ppm and a bromide content of 67 ppm.

EXAMPLE IV a. An additive for engine testing comprising cyclooctadiene platinum diphenyl ($CODPt(C_6H_5)_2$) is prepared according to the following procedure:

a1. A Grignard reagent is prepared by combining 16 gr of magnesium, 109 ml of ethyl ether and 0.05 gr iodine crystal as a catalyst. The reaction is started by the addition of 0.5 ml of bromobenzene with gentle heating. A mixture comprising 91 grams of bromobenzene and 325 ml of ethyl ether is then slowly added. The reaction is allowed to go to completion by refluxing.

Thusly prepared Grignard reagent (350 ml) and 81 ml of benzene are then combined under a nitrogen blanket. Cyclooctadiene platinum dichloride (40.4 gr) is then slowly added, with the temperature maintained below 90° F. for 1 hour. Ethyl ether (81 ml) and benzene (81 ml) are then added and stirring continued for 4 hours. The resultant mixture is then diluted to 1293 ml with benzene, stirred to dissolve all solids and then cooled to 0° F. The cooled solution is hydrolyzed with 162 ml of distilled water, then washed twice with 160 ml of distilled water. 685 ml of this solution is then slurried with about 10 gr of activated carbon. The resulting slurry is filtered and the solvents are partially evaporated under vacuum to provide a yield of $CODPt(C_6H_5)_2$ of 13.85 grams.

a2. A Grignard reagent is prepared by combining 20 gr of magnesium, 135 ml of ethyl ether and 0.05 gr iodine crystal as a catalyst. The reaction is started by the addition of 1 ml of bromobenzene with gentle heating. A mixture comprising 113 grams of bromobenzene and 404 ml of ethyl ether is then slowly added. The reaction is allowed to go to completion by refluxing.

The thusly prepared Grignard reagent (469 ml) and 100 ml of benzene are then combined under a nitrogen blanket. Cyclooctadiene platinum dichloride (50 gr) is then slowly added, with the temperature maintained below 90° F. and the mixture allowed to stand overnight. 100 ml of ethyl ether and 100 ml of benzene are then added and stirring continued for 1 hour. The resultant mixture is then diluted to 1600 ml with benzene, stirred to dissolve all solids and then cooled to 0° F. The cooled solution is hydrolyzed with 201 ml of distilled water, then washed twice with 200 ml of distilled water. 1530 ml of this solution is then washed once with 180 ml of distilled water and slurried with about 10 gr of activated carbon. The resulting slurry is filtered and the solvents are partially evaporated 700 ml under vacuum, and then again slurried with about 10 gr of activated carbon. The solvents are again partially evaported under vacuum to provide a yield of $CODPt(C_6H_5)_2$ of 27.23 grams.

a3. The 41.08 gr of $CODPt(C_6H_5)_2$ prepared as described above is combined and dissolved in a mixture comprising 396 ml of ethyl ether and 396 ml of benzene under nitrogen blanket. A Grignard reagent prepared as in al. above (5 ml) is then added and the mixture is stirred for two hours and allowed to stand at room temperature overnight. The mixture is cooled to 0° F. and hydrolyzed with 201 ml of distilled water, then washed three times with 200 ml of distilled water. The solution is slurried with activated carbon and filtered, and the solvents partially evaporated under vacuum to provide a yield of $CODPt(C_6H_5)_2$ of 25.9 grams (analyzed to contain 388 ppm of bromine and 4.4 ppm of iodine).

a4. The thusly prepared $CODPt(C_6H_5)_2$ is then added to a solvent mixture comprising acetone, xylene, kerosene and a detergent to provide a fuel additive comprising 0.30% of $CODPt(C_6H_5)_2$.

b. The fuel economy benefit provided by an additive prepared as in Example IVa is tested by the following procedure:

The engine on which the test is run is a Cummins 6CTA8.3 Diesel Engine rated 240 horsepower (HP) at 2100 revolutions per minute (RPM), which is mounted on an engine dynamometer with motoring capabilities. The fuel is Phillips 2-D emissions grade test diesel fuel. The engine is lubricated with a low ash lubricating oil.

An engine foundation baseline is established by running cold and hot-start transient cycles according to U.S. Government-established test procedures required for engine certification testing (the protocol for the cold/hot transient cycle is in accordance with standard U.S. Environmental Protection Agency (EPA) test heavy duty protocols, as set out in Title 40, Code of Federal Regulations, Part 86, and involve running the engine while varying the torque and speed according to a prescribed procedure).

The fuel efficiency of the engine without treatment by the additive is tested by running the engine through 5 cold/hot EPA transient procedures and recording the fuel consumed per horsepower time (liters/HP-hour) for each run. Means of the cold and hot cycle results are each calculated, as are the weighted composites for each full cold/hot transient cycle. The composites weight the cold start as 1 part and the hot start as 6 parts of a total of 7, again in accordance with standard EPA procedure.

The engine is then run for about 9000 miles with treatment according to the following procedure:

the first approximately 3000 miles with treatment by the additive at a platinum metal concentration of 0.15 ppm;

the next approximately 1000 miles at 0.5 ppm; and the next approximately 5000 miles at 0.15 ppm.

The 5 cold and hot transient cycles are then run as described above, the means and composites calculated, and the percent decrease in fuel consumption calculated therefrom.

The results are set out in Table 2 and graphically illustrated in FIG. 1.

TABLE 2

| | Specific Fuel Consumption | | |
|---|---|---|---|
| | Cold Start Transient lbs fuel/HP-hour | Hot Start Transient lbs fuel/HP-hour | Composite lbs fuel/ HP-hour |
| | Without Treatment | | |
| | 0.403 | 0.391 | 0.393 |
| | 0.408 | 0.397 | 0.399 |
| | 0.415 | 0.398 | 0.400 |
| | 0.411 | 0.379 | 0.384 |
| | 0.408 | 0.393 | 0.395 |
| Mean | 0.409 | 0.392 | 0.394 |
| | With Treatment | | |
| | 0.395 | 0.382 | 0.384 |
| | 0.389 | 0.385 | 0.385 |
| | 0.391 | 0.368 | 0.371 |
| | With Treatment | | |
| | 0.378 | 0.348 | 0.348 |
| | 0.394 | 0.375 | 0.378 |
| Mean | 0.389 | 0.371 | 0.373 |
| | % Reduction in Fuel Consumption | | |
| | 4.9 | 5.4 | 5.3 | c. The reduction in emissions provided by an additive prepared as in Example IVa is tested by the following procedure:

The engine described in Example IVb is run with treatment as described. At the start, baseline emissions are measured by conventional EPA procedures for five cold/hot transient cycles. Then after mile 9000, approximately, five cold/hot transient cycles are again run, with the emissions of hydrocarbons and carbon monoxide measured and the percent reduction from baseline calculated. The results are set out in Tables 3 and 4

TABLE 3

| | Gaseous Hydrocarbons | | |
|---|---|---|---|
| | Cold Start Transient Grams/HP-hour | Hot Start Transient Grams/HP-hour | Composite Grams/ HP-hour |
| | Without Treatment | | |
| | 0.39 | 0.32 | 0.33 |
| | 0.40 | 0.34 | 0.35 |
| | 0.41 | 0.34 | 0.35 |
| | 0.47 | 0.37 | 0.39 |
| | 0.40 | 0.36 | 0.37 |
| Mean | 0.41 | 0.35 | 0.36 |

TABLE 3-continued

Gaseous Hydrocarbons

| Cold Start Transient Grams/HP-hour | Hot Start Transient Grams/HP-hour | Composite Grams/ HP-hour |
|---|---|---|
| *With Treatment* | | |
| 0.35 | 0.29 | 0.30 |
| 0.37 | 0.29 | 0.30 |
| 0.37 | 0.27 | 0.28 |
| 0.23 | 0.27 | 0.28 |
| 0.35 | 0.29 | 0.30 |
| Mean 0.35 | 0.28 | 0.29 |
| % Reduction 14.6 | 20 | 19.4 |

TABLE 4

Carbon Monoxide

| Cold Start Transient Grams/HP-hour | Hot Start Transient Grams/HP-hour | Composite Grams/ HP-hour |
|---|---|---|
| *Without Treatment* | | |
| 1.43 | 0.98 | 1.05 |
| 1.31 | 0.94 | 1.00 |
| 1.36 | 0.99 | 1.04 |
| 1.37 | 0.90 | 0.96 |
| 1.27 | 0.95 | 0.99 |
| Mean 1.35 | 0.95 | 1.01 |
| *With Treatment* | | |
| 1.18 | 0.81 | 0.86 |
| 1.17 | 0.83 | 0.88 |
| 1.21 | 0.78 | 0.84 |
| 1.11 | 0.76 | 0.81 |
| 1.12 | 0.83 | 0.87 |
| Mean 1.16 | 0.80 | 0.85 |
| %Reduction 14.1 | 15.8 | 15.8 | d. The increase in horsepower provided by the additive of this invention is demonstrated by use of the engine described in Example IVb, run as baseline and with treatment as described, and generating an "engine map" of the horsepower generated at specific RPM levels by known methods. Representative data points between 1750 RPM and 2150 RPM are set out in Table 5 and graphically illustrated in FIG. 2.

TABLE 5

| Without Treatment | | With Treatment | |
|---|---|---|---|
| RPM | Horsepower | RPM | Horsepower |
| 1758 | 215.5 | 1754 | 217.1 |
| 1766 | 217.9 | 1766 | 219.9 |
| 1778 | 220.0 | 1777 | 222.7 |
| 1802 | 224.0 | 1792 | 224.2 |
| 1825 | 226.2 | 1801 | 225.3 |
| 1857 | 228.4 | 1815 | 226.7 |
| 1895 | 231.9 | 1833 | 228.2 |
| 1924 | 233.3 | 1847 | 229.3 |
| 1948 | 234.6 | 1882 | 232.6 |
| 1974 | 236.6 | 1903 | 233.3 |
| 2000 | 238.6 | 1926 | 235.4 |
| 2012 | 239.2 | 1935 | 236.4 |
| 2032 | 240.9 | 1949 | 237.5 |
| 2035 | 240.4 | 1979 | 238.7 |
| 2079 | 242.0 | 1996 | 239.7 |
| 2100 | 241.5 | 2014 | 241.4 |
| 2117 | 238.6 | 2028 | 242.0 |
| 2126 | 237.6 | 2037 | 242.2 |
| 2135 | 236.1 | 2054 | 242.7 |
| 2144 | 234.1 | 2063 | 243.0 |
| | | 2081 | 242.6 |
| | | 2087 | 242.5 |
| | | 2095 | 241.9 |
| | | 2101 | 241.3 |
| | | 2116 | 237.7 |
| | | 2133 | 235.1 |
| | | 2142 | 230.7 |
| | | 2148 | 225.5 | e. The decrease in pressure drop across a diesel trap through which the exhaust flows provided by the additive of this invention (which is indicative of lower trap loading and more effective and longer performance) is measured by measuring the pressure drop (in inches of water) across a diesel trap over time by conventional means in the engine described in Example IVb running without treatment as a baseline and with treatment as described. The results are set out in Table 6 and graphically illustrated in FIG. 3.

TABLE 6

| Without Treatment | | With Treatment | |
|---|---|---|---|
| Hours | Pressure Drop | Hours | Pressure Drop |
| 0 | 3.8 | 0 | 2.8 |
| 4.7 | 5.2 | 1.4 | 4.0 |
| 5.8 | 5.6 | 2.2 | 4.2 |
| 7.0 | 6.2 | 2.9 | 4.4 |
| 8.3 | 8.0 | 3.0 | 3.5 |
| 9.7 | 8.3 | 4.0 | 4.6 |
| 10.3 | 9.5 | 4.7 | 4.8 |
| 11.6 | 10.1 | 5.9 | 5.2 |
| 12.8 | 10.2 | 7.0 | 5.8 |
| 13.9 | 12.0 | 8.1 | 6.4 |
| 15.0 | 12.7 | 9.1 | 7.1 |
| 15.2 | 13.3 | 10.2 | 7.9 |
| 16.8 | 13.8 | 11.3 | 8.5 |
| 17.0 | 14.0 | 12.4 | 9.2 |
| 17.3 | 14.5 | 13.5 | 9.8 |
| | | 14.6 | 10.5 |
| | | 15.7 | 11.5 |
| | | 16.8 | 11.8 |
| | | 17.9 | 11.8 |
| | | 18.9 | 12.3 |
| | | 20.0 | 12.3 |
| | | 21.2 | 13.0 |
| | | 22.3 | 13.5 |
| | | 23.4 | 13.8 |
| | | 24.4 | 13.8 |
| | | 25.6 | 14.0 |
| | | 26.7 | 15.5 |
| | | 27.8 | 15.5 |
| | | 28.9 | 16.5 |
| | | 30.7 | 14.0 |
| | | 31.1 | 14.1 |
| | | 31.4 | 14.3 |
| | | 31.8 | 14.3 |

Figure 2:
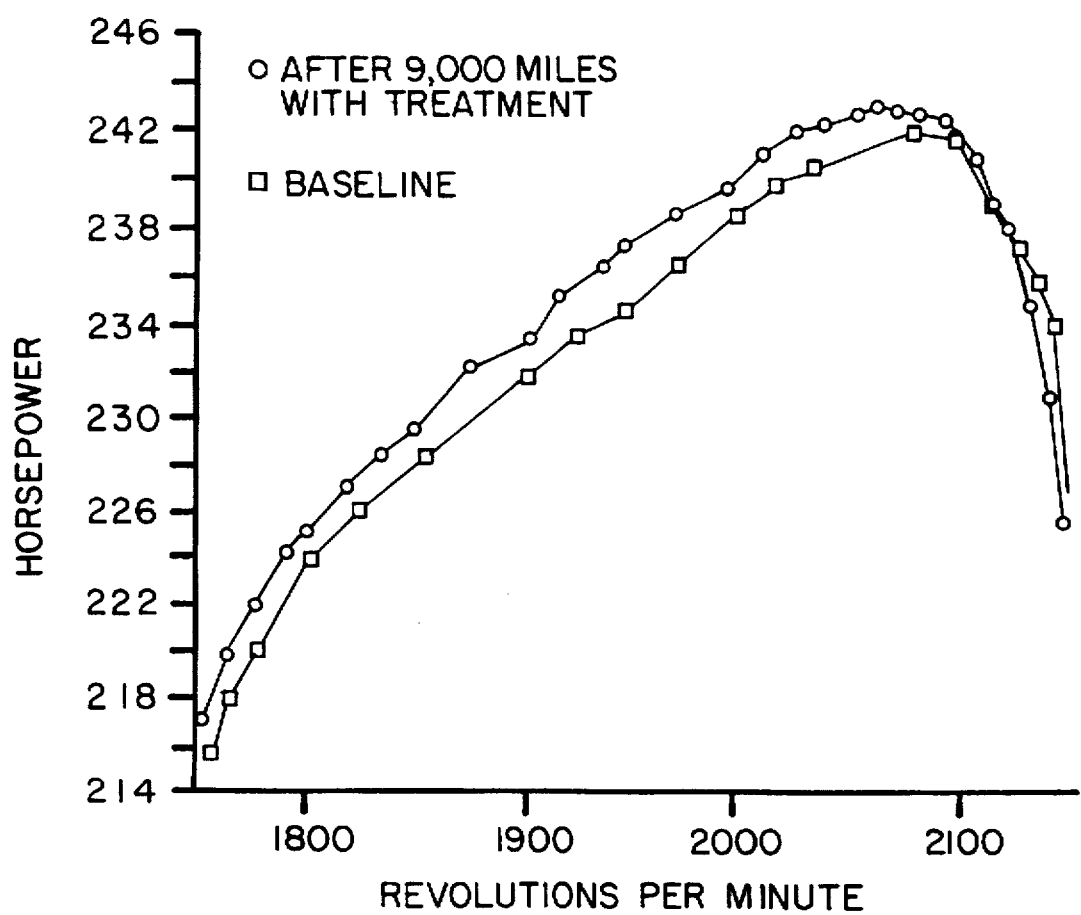
FIG. 2 graphically represents the results of Example IVd.
Figure 3:
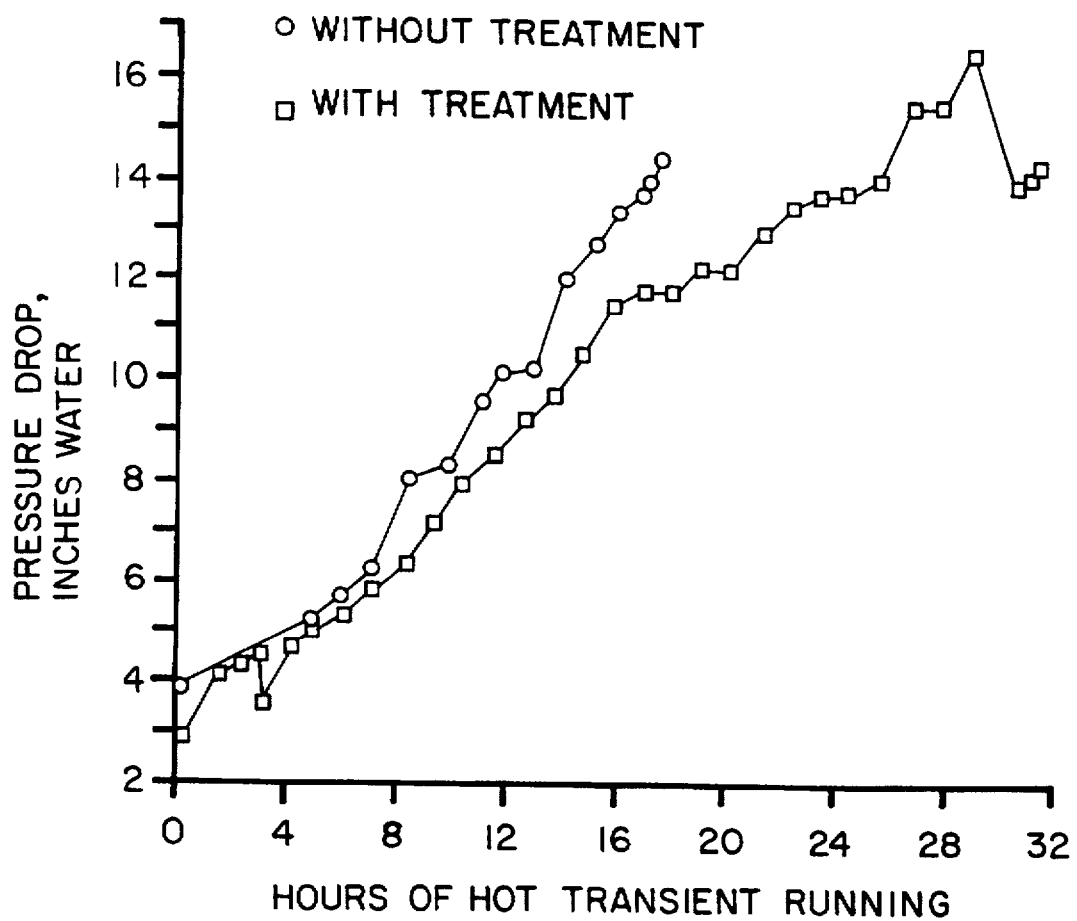
FIG. 3 graphically represents the results of Example IVe.

From the data of Tables 2 through 6, as graphically illustrated in FIGS. 1 through 3, it is apparent that the method of the present invention is effective at increasing the utilizable energy of fuel, by decreasing fuel consumption and increasing horsepower; reducing emissions such as hydrocarbons and carbon monoxide; and increasing the effectiveness and life of a diesel particulate trap.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A method for improving the operation of the post-combustion pollution control device installed on a fuel-powered vehicle, the method comprising admixing with the fuel an additive which comprises a platinum group metal composition.

2. The method of claim 1 wherein said post-combustion pollution control device comprises a catalytic converter.

3. The method of claim 2 wherein said composition has a breakdown temperature at least about 50° C.

4. The method of claim 3 wherein the fuel comprises gasoline or diesel fuel.

5. The method of claim 4 wherein the partition ratio of said composition is at least about 50.

6. The method of claim 2 wherein said additive further comprises a fuel-soluble solvent for said composition.

7. The method of claim 6 wherein the fuel is gasoline and said solvent is ethanol, acetone, tetrahydrofuran, methyl tertiary butyl ether or mixtures thereof.

8. The method of claim 2 wherein said additive is present in an amount such that the platinum group metal is present in an amount of from 0.01 to 1.0 parts per million of the fuel.

9. The method of claim 2 wherein said composition is substantially free of phosphorous, arsenic, antimony and halides.

10. A method for improving the operation of a catalytic converter comprising admixing with the fuel used to power an engine an additive which comprises a fuel-soluble, nonionic, organometallic platinum group metal coordination composition wherein said composition is
   a) resistant to breakdown under ambient temperatures;
   b) does not contain a disadvantageous amount of phosphorus, arsenic, antimony or halides; and
   c) has a partition ratio sufficient to maintain preferential solubility in the fuel.

11. The method of claim 10 wherein said composition has a breakdown temperature at least about 50° C.

12. The method of claim 11 wherein the fuel comprises gasoline.

13. The method of claim 12 wherein the partition ratio of said composition is at least about 50.

14. The method of claim 10 wherein said additive further comprises a fuel-soluble solvent for said composition.

15. The method of claim 11 wherein the fuel is gasoline and said solvent is ethanol, acetone, tetrahydrofuran, methyl tertiary butyl ether or mixtures thereof.

16. The method of claim 10 wherein said additive is present in an amount such that the platinum group metal is present in an amount of from 0.01 to 1.0 parts per million of the fuel.

17. The method of claim 10 wherein said composition is substantially free of phosphorous, arsenic, antimony and halides.

18. A method for improving the operation of a catalytic converter, comprising admixing with the gasoline used to power an engine an additive which comprises a gasoline soluble platinum group metal composition having at least one platinum group metal to carbon bond.

19. The method of claim 18 wherein said composition has a breakdown temperature at least about 50° C.

20. The method of claim 18 wherein the partition ratio of said composition is at least about 50.

21. The method of claim 18 wherein said additive further comprises a fuel-soluble solvent for said composition.

22. The method of claim 21 wherein said solvent is ethanol, acetone, tetrahydrofuran, methyl tertiary butyl ether or mixtures thereof.

23. The method of claim 18 wherein said additive is present in an amount such that the platinum group metal is present in an amount of from 0.01 to 1.0 parts per million of the fuel.

24. The method of claim 18 wherein said composition is substantially free of phosphorous, arsenic, antimony and halides.

25. A method for improving the operation of a diesel engine particulate trap comprising admixing with diesel fuel used to power a diesel engine, and additive which comprises an organometallic platinum group metal composition wherein said composition
   a) has a partition ratio sufficient to maintain preferential solubility in the diesel fuel;
   b) is resistant to breakdown under ambient temperatures;
   c) does not contain a disadvantageous amount of phosphorus, arsenic, antimony or halides.

26. The method of claim 25 wherein said composition has a breakdown temperature at least about 50° C.

27. The method of claim 26 wherein the partition ratio of said composition is at least about 50.

28. The method of claim 25 wherein said additive further comprises a diesel fuel-soluble solvent for said composition.

29. The method of claim 26 wherein said solvent comprises octyl nitrate.

30. The method of claim 25 wherein said additive is admixed with the diesel fuel in an amount such that the platinum group metal is present in an amount of from 0.01 to 1.0 parts per million of the diesel fuel.

31. The method of claim 25 wherein said composition is substantially free of phosphorous, arsenic, antimony and halides.

32. A method for improving the operation of a post-combustion pollution control device installed on a fuel-powered vehicle, the method comprising admixing with the fuel an additive which comprises a mixture, the mixture comprising a platinum group metal composition and an oxygenated hydrocarbon solvent which is soluble in the fuel, wherein the mixture is present in the fuel in an amount effective to provide from about 0.01 to about 1.0 parts per million of platinum group metal in the fuel.

33. The method of claim 32 wherein the post-combustion pollution control device comprises a diesel engine particulate trap or a catalytic converter and the fuel comprises diesel fuel or gasoline.

34. The method of claim 33 wherein the platinum group metal composition comprises an organometallic platinum group metal composition which is resistant to breakdown under ambient conditions.

35. The method of claim 34 wherein the platinum group metal composition has a breakdown temperature of at least about 50° C.

36. The method of claim 32 wherein the solvent is selected from the group consisting of alcohols, heterocyclic oxygen compounds, ethers and mixtures thereof.

37. The method of claim 36 wherein the solvent is selected from the group consisting of alcohols having from 1 to 4 carbons, tetrahydrofuran, methyl tertiary butyl ether and mixtures thereof.

* * * * *

UNITED STATES PATENT AND TRADEMARK OFFICE
CERTIFICATE OF CORRECTION

PATENT NO. : 5,749,928
DATED : May 12, 1998
INVENTOR(S) : W. Robert Epperly *et al.*

It is certified that error appears in the above-identified patent and that said Letters Patent is hereby corrected as shown below:

At Column 15, line 23, claim 4, "or diesel fuel" should be deleted.

At Column 16, line 18, "and" should be replaced with --an--.

Signed and Sealed this

Third Day of November, 1998

*Attest:*

BRUCE LEHMAN

*Attesting Officer*  Commissioner of Patents and Trademarks